United States Patent
Ayers et al.

(10) Patent No.: US 9,162,180 B1
(45) Date of Patent: Oct. 20, 2015

(54) INDUSTRIAL WASTE HEAT RECOVERY AND CONCURRENT POLLUTION CONTROL THROUGH THE UNIQUE APPLICATION OF AN UNDERGROUND LIMESTONE MINE

(71) Applicant: Mississippi Lime Company, St. Louis, MO (US)

(72) Inventors: William Ayers, Glen Carbon, IL (US); Tom McCoy, Festus, MO (US)

(73) Assignee: Mississippi Lime Company, St. Louis, MO (US)

( * ) Notice: Subject to any disclaimer, the term of this patent is extended or adjusted under 35 U.S.C. 154(b) by 0 days.

(21) Appl. No.: 14/207,182

(22) Filed: Mar. 12, 2014

Related U.S. Application Data

(60) Provisional application No. 61/777,584, filed on Mar. 12, 2013.

(51) Int. Cl.
*B65G 65/00* (2006.01)
*B01D 53/82* (2006.01)

(52) U.S. Cl.
CPC *B01D 53/82* (2013.01); *Y02C 10/14* (2013.01)

(58) Field of Classification Search
CPC ........................................................ Y02C 10/14
See application file for complete search history.

(56) References Cited

U.S. PATENT DOCUMENTS

| | | | | |
|---|---|---|---|---|
| 4,441,840 A | * | 4/1984 | Bassier et al. | 405/267 |
| 5,682,709 A | * | 11/1997 | Erickson | 47/58.1 R |
| 2013/0125792 A1 | * | 5/2013 | Fried | 106/819 |

* cited by examiner

*Primary Examiner* — John Kreck
(74) *Attorney, Agent, or Firm* — Lewis Rice LLC

(57) ABSTRACT

Systems and method for utilizing a generally unused and sealed off portion of an underground limestone mine, generally which is still elsewhere in use, to become a portion of a pollution mitigation system for the exhaust gases of a limestone kiln or other co-located industrial process.

8 Claims, 1 Drawing Sheet

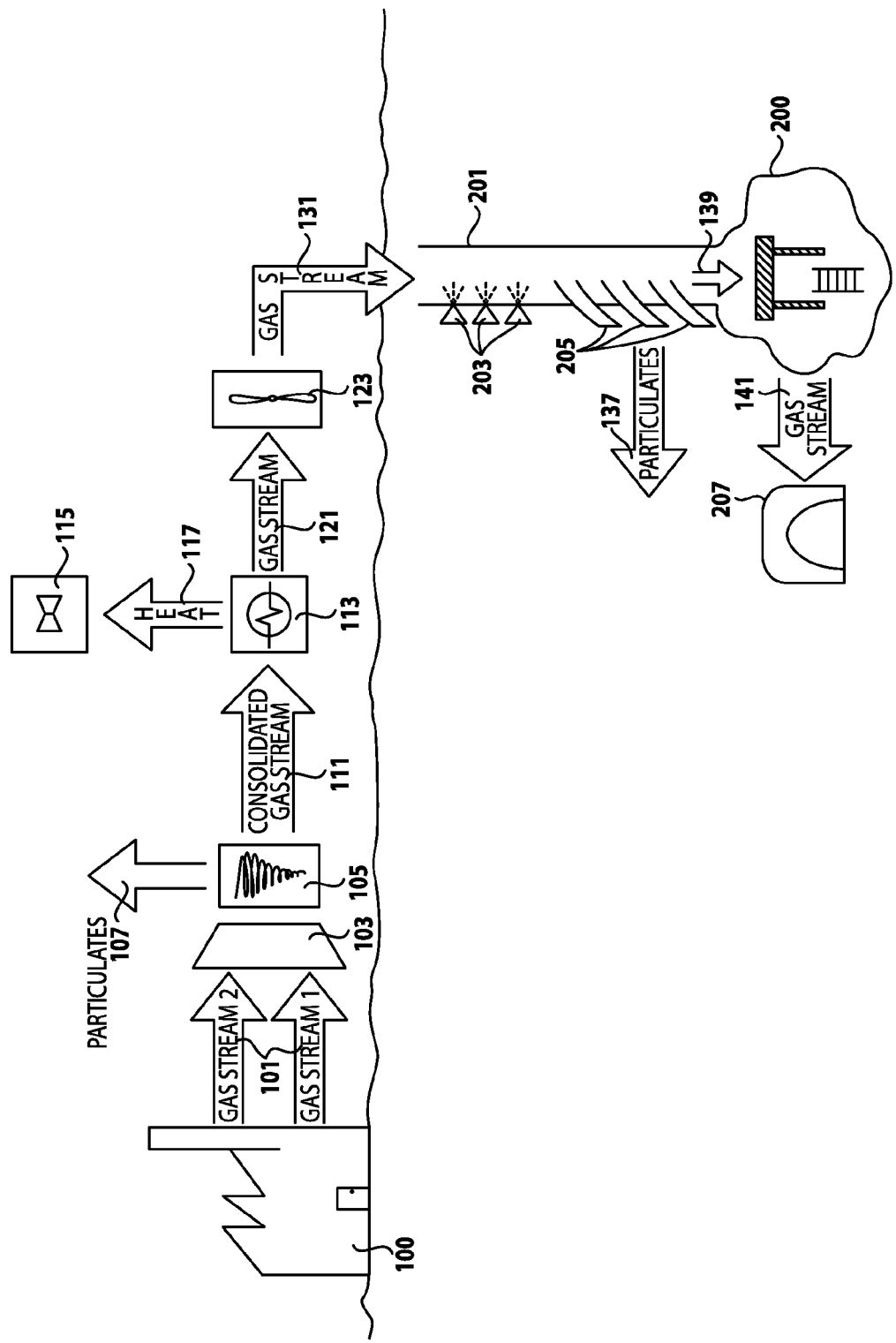

INDUSTRIAL WASTE HEAT RECOVERY AND CONCURRENT POLLUTION CONTROL THROUGH THE UNIQUE APPLICATION OF AN UNDERGROUND LIMESTONE MINE

CROSS REFERENCE TO RELATED APPLICATIONS

This application claims benefit of U.S. Provisional Patent Application No. 61/777,584, filed Mar. 12, 2013, the entire disclosure of which is incorporated herein by reference.

BACKGROUND

1. Field of the Invention

This disclosure relates to systems and methods for the use of an underground limestone mine in the treatment of effluent gas from an industrial operation.

2. Description of the Related Art

Flue gas treatment has become a focus of electric utilities and industrial operations due to increasingly tighter air quality standards. As companies seek to comply with air quality regulations, the need arises for effective flue gas treatment options. Alkali species based on alkali or alkaline earth metals are common sorbents used to neutralize the acid components of the flue gas. The most common of these alkalis are sodium, calcium, or magnesium-based. A common method of introduction of the sorbents into the gas stream is to use dry sorbent injections.

One commonly used material for the scrubbing of acid gases is hydrated lime. It has been established that hydrated lime can provide a desirable reaction to act as a mitigation agent (due to its favorable reaction with Sulfur Trioxide ($SO_3$)) and hydrated lime systems have been proven successful in many full scale operations. These systems operate continuously to provide utility companies with a dependable, cost-effective means of acid gas control.

At the same time, while lime products can be useful in the elimination of flue gas pollutants, the production of lime, as is true with a variety of industrial processes, can actually serve as a source for pollutants. Specifically, in a variety of industrial processes such as the production of lime, aluminum, steel, or other materials where significant heat is needed, the heat is often generated from the incineration of fuel, such as coal. The gas exiting these smelters and kilns often contains high concentrations of particulate matter as well as the natural by-products of combustion processes, which are essentially the same as those produced from a power plant utilizing the same type of fuel.

In a lime kiln, the gas will generally comprise lime and limestone particles as well as ash particles from the fuel being burned along with various gaseous pollutants including sulfur, nitrogen, carbon oxide, chlorine and mercury compounds. The gas also still contains much of the heat of combustion that was used to calcine the raw material into lime and is in the range of 1200 to 1300 degrees Fahrenheit.

Lime kilns (and other industrial processes for mined products) are often co-located with corresponding mines in order to simplify processing and transportation in the material production. In the case of lime, the underlying mine is generally a mine for limestone and the mine has rarely had all the limestone removed therefrom.

While limestone is commonly obtained from a quarry, the underground mining of limestone can be both economical and necessary in certain areas. This can be for a variety of reasons including regulatory ones and those related to the economy of removing overlaying rock in order to quarry. Underground limestone mines will generally comprise a "room and pillar" construction to provide for sufficient roof support and stability. Thus, a mine which is in use will often have large unused portions where all economical limestone has been removed and miners have moved on to a different area.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Described herein, among other things, are systems and methods for utilizing a generally unused and sealed-off portion of an underground limestone mine, which is still elsewhere in use, to become a portion of a pollution mitigation system for the exhaust gases of a limestone kiln or other co-located industrial process.

In an embodiment, there is described herein a method for pollution control of an exhaust gas stream from a lime kiln, the method comprising: providing an exhaust gas stream including lime particulates and combustion byproducts; cycloning the exhaust gas stream to remove at least a portion of said lime particulates from said exhaust gas stream; converting heat in said exhaust gas stream to a form useable by a generator; feeding said exhaust gas stream into an underground mineshaft, said mineshaft connecting to a sealed-off portion of a limestone mine; allowing said combustion byproducts to react with limestone remaining in said sealed-off portion of said limestone mine; and exhausting said exhaust gas stream from a mine opening.

In an embodiment of the method, the cycloning is performed by a multi-cyclone.

In an embodiment of the method, converting heat is performed by a heat exchanger.

In an embodiment of the method, the limestone mine is still operating as an active mine.

In an embodiment of the method, the lime particulates are reacted with said exhaust gas stream and water in said underground mineshaft.

There is also described herein a system for pollution control of an exhaust gas stream from a lime kiln, the system comprising: a multi-cyclone; a heat-exchanger; and an underground mineshaft, said mineshaft connecting to a sealed-off portion of a limestone mine; wherein an exhaust gas is fed into said multi-cyclone to remove particulates, said heat-exchanger to remove heat, and said sealed-off portion of said limestone mine to remove combustion byproducts.

In an embodiment of the system, the limestone mine is still operating as an active mine.

In an embodiment of the system, the particulates are reacted with said exhaust gas stream and water in said underground mineshaft.

BRIEF DESCRIPTION OF THE DRAWINGS

For a better understanding of the embodiments described herein and to show more clearly how they may be carried into effect, reference will now be made, by way of example only, to the accompanying drawing which shows at least one exemplary embodiment.

FIG. 1 provides an embodiment of a conceptual diagram showing one layout of a pollution control mechanism utilizing a limestone mine as part of the treatment.

DESCRIPTION OF THE PREFERRED EMBODIMENT(S)

In general, there is described herein a system for the effective use of waste heat from an industrial process such as, but not limited to, one or more lime or cement kilns for the combined production of energy in the form of electricity and/or steam and the cooling of the gas stream to make it more suitable for pollutant removal and to reduce the total gas volume requiring treatment resulting in smaller treatment devices at lower cost. This system is used in conjunction with one or more shafts to an existing or abandoned mine as non-corrosive treatment chambers to allow the addition of moisture and reagents as needed to react with and remove various pollutants in the gas stream, including but not limited, to sulfur compounds, chlorine compounds and mercury compounds and to provide a means to cost effectively collect the majority of these reacted compounds for separate handling. Finally, a contained portion of an underground limestone mine is used as a large non-corrosive cooling chamber for further removal of acidic contaminants still present in the gas stream, further gas volume reduction, and drop out of additional particulate material present in the gas stream due to reduced gas velocity.

FIG. 1 provides an example of how such a system works. In FIG. 1 there is provided a plant (100) with multiple long dry lime kilns that are fired with a blend of coal and petroleum coke. The particulate matter suspended in the effluent gas stream (101) is a valuable product suitable for sale, as well as on-site use, as a reagent for acid gas removal. However, it is not compatible with the cost effective removal of heat energy from the gas stream and therefore the particulate matter generally needs to be removed first.

In the embodiment of FIG. 1, the gas (101) from the multiple kilns is gathered into a common header duct (103) leading to a multiple chamber multi-cyclone device (105) for removal of most of the particulate matter (107). The modular multi-cyclones system allows for flexible treatment of all the gas (101) from the kilns while still allowing for routine online maintenance of the system without shutting down the kiln operation. The remaining particulate matter will not interfere with the waste heat reclamation, yet provides for additional acid gas pollutant removal as the gas stream continues through the system.

Very little heat is lost as the resulting gas stream (111) passes through the particulate removal step. This heat generally must be removed in order to allow for economic treatment and movement of the gas (111) further downstream. To achieve this temperature reduction, a gas to liquid heat exchanger (113) is employed to reduce the temperature of the gas down to 350-450 degrees Fahrenheit. It should be noted that there are numerous options for this heat reduction step as known to those of ordinary skill in the art. These options range from technologies to convert the heat directly, to electricity, to spray towers to cool the gas with water sprays, and other technologies that potentially further remove gaseous pollutants.

In addition, if there are excess concentrations of carbon monoxide present in the gas stream, additional fuel could be added under sub-stoichiometric conditions thereby reducing nitrogen oxide (NOx) compounds at this time. Furthermore, air could be added after that point to burn out both the added fuel and carbon monoxide (CO) and all of this added heat would be recovered in the heat exchanger.

The heat (117) removed in the heat exchanger (113) in this example is converted to steam which can then be used to drive a turbine generator (115) to produce electricity or used as steam for process heating needs such as stone drying, combustion air preheating, system heating and/or cooling or any one of a large number of other potential applications.

Because this energy reclamation comes from heat that would otherwise have been discharged to the atmosphere, it is energy produced with zero additional pollution emissions, including carbon dioxide. Thus, it is anticipated that this energy would qualify for renewable energy credits and future greenhouse gas removal credits, resulting in further cost efficiencies.

As a result of the temperature reduction, the resulting gas stream (121) is now much more suitable for further handling and movement by simpler devices such as fans (123) and application of pollutant reduction technologies.

In order to introduce the gas stream to the mine (200), booster fans (123) are preferred to provide the motive force to pull the gas (121) through the upstream devices (e.g. multi-cyclone (105) and heat exchanger (113)) and push the resulting gas (131) down one or more shafts (201) and into the underground mine (200). Because most of the particulate (107) has been removed and the temperature has been lowered, much less expensive booster fans (123) can be employed. It will be understood that the size and number of fans (123) can be optimized to address various factors such as cost and reliability.

The shaft(s) (201) developed to carry the gas to the mine (200) are ideally suited to serve the dual purpose of a non-corrosive conveyance mechanism and a spray chamber for further pollution control. If control is needed for sulfur oxide (SOx) or other acid gasses or if simple cooling is required, a bank of spray nozzles (203) or another atomizing device can be used to introduce finely divided water droplets at the top of the enclosed shaft (201). This moisture can serve to both cool the gas (131) and interact with any remaining lime particles present in the gas stream (131) in order to remove acidic gases present in the gas stream (131). The amount of water added would be controlled to insure that it has been evaporated by the time it reaches the bottom of the shaft (201). If additional pollutant control is required, reagents can be added at the top of the shaft as well, either in a dry state separate from the water spray nozzles or as a slurry. Kiln dust removed with the particulates (107) can be used as a reagent for acid gas removal or activated carbon can be injected.

Towards the base of the shaft (201), multiple drop-out chambers (205) can be created to cause a portion of the particulate reactants (137) to drop out of the gas stream. These chambers (205) can be designed such that each one can be independently sealed off for periodic cleanout while the system is still operating. Such cleanout can be either manual or automated.

The resultant gas stream (139) would then exit the drop out chambers (205) and enter a sealed off portion of a previously mined-out section of the mine (200). Subgrade temperatures are nearly constant year round and, in this example, are about 55 degrees Fahrenheit in mined-out sections (200) which provides an environment for further cooling of the exhaust gas. The effective cross sectional area of the non-corrosive conveyance in the mine (200) is significantly larger than the shafts (201) and so the gas velocity slows considerably allowing for further particulate drop out. Due to the inherent moisture in the gas stream, and that added at the top of the shaft (201), this moisture will generally condense as the gas continues to cool along with pollutants present in the gas stream (131). Because the chamber (200) is made up mostly or entirely of limestone and is very large in area, the acids produced are quickly neutralized by reaction with the limestone present in the mine (200).

Once it has had a chance to occupy the mine (200), the gas stream (141) finally makes its way to the defined mine exit (207). At this point, in the unlikely event that there are any remaining pollutants of concern present in the gas stream (141), additional controls can be employed at the mine exit (207). As the gas stream (141) exits the mine, one or more fans can be employed to introduce the cleaned gas stream to a stack, if desired.

As previously noted, this unique approach is highly flexible and can be used in a wide variety of mix and match options to solve only those issues of import to the end user.

While the inventions have been disclosed in connection with certain preferred embodiments, this should not be taken as a limitation to all of the provided details of any invention. Modifications and variations of the described embodiments may be made without departing from the spirit and scope of any invention herein disclosed, and other embodiments should be understood to be encompassed in the present disclosure as would be understood by those of ordinary skill in the art.

The invention claimed is:

1. A method for pollution control of an exhaust gas stream from a lime kiln, the method comprising:
   providing an exhaust gas stream including lime particulates and combustion byproducts;
   cycloning the exhaust gas stream to remove at least a portion of said lime particulates from said exhaust gas stream;
   converting heat in said exhaust gas stream to a form useable by a generator;
   feeding said exhaust gas stream into an underground mineshaft, said mineshaft connecting to a sealed-off portion of a limestone mine;
   allowing said combustion byproducts to react with limestone remaining in said sealed-off portion of said limestone mine; and
   exhausting said exhaust gas stream from a mine opening.

2. The method of claim 1 wherein said cycloning is performed by a multi-cyclone.

3. The method of claim 1 wherein said converting heat is performed by a heat exchanger.

4. The method of claim 1 wherein said limestone mine is still operating as an active mine.

5. The method of claim 1 wherein said at least a portion of said lime particulates are reacted with said exhaust gas stream and water in said underground mineshaft.

6. A system for pollution control of an exhaust gas stream from a lime kiln, the system comprising:
   a multi-cyclone;
   a heat-exchanger; and
   an underground mineshaft, said mineshaft connecting to a sealed-off portion of a limestone mine;
   wherein an exhaust gas is fed into said multi-cyclone to remove particulates, said heat-exchanger to remove heat, and said sealed-off portion of said limestone mine to remove combustion byproducts.

7. The system of claim 6 wherein said limestone mine is still operating as an active mine.

8. The system of claim 6 wherein said at least a portion of said particulates are reacted with said exhaust gas stream and water in said underground mineshaft.

* * * * *